United States Patent [19]

Aoki

[11] Patent Number: 5,845,031
[45] Date of Patent: Dec. 1, 1998

[54] OPTICAL MODULE HAVING AN IMPROVED HEAT DISSIPATION AND REDUCED MECHANICAL DISTORTION

[75] Inventor: Hiroatsu Aoki, Kawasaki, Japan

[73] Assignee: Fujitsu Limited, Kanagawa, Japan

[21] Appl. No.: 877,582

[22] Filed: Jun. 17, 1997

[30] Foreign Application Priority Data

Dec. 20, 1996 [JP] Japan ................................. 8-342035

[51] Int. Cl.⁶ ........................................ G02B 6/36
[52] U.S. Cl. ............................................. 385/92
[58] Field of Search ............................. 385/88–93, 147, 385/33, 47, 49, 15, 27; 372/45, 49; 359/217, 299

[56] References Cited

U.S. PATENT DOCUMENTS

| | | | |
|---|---|---|---|
| 4,383,755 | 5/1983 | Fedder et al. | 359/217 |
| 4,955,683 | 9/1990 | Shiga et al. | 385/88 |
| 5,031,984 | 7/1991 | Eide et al. | 385/27 |
| 5,526,160 | 6/1996 | Watanabe et al. | 359/163 |
| 5,661,835 | 8/1997 | Kato et al. | 385/92 |
| 5,764,826 | 6/1998 | Kuhara et al. | 385/88 |

*Primary Examiner*—Akm E. Ullah
*Attorney, Agent, or Firm*—Armstrong, Westerman, Hattori, McLeland & Naughton

[57] ABSTRACT

An optical module includes a heat sink, a cooling device provided on the heat sink, an optical semiconductor device provided on the cooling device, a frame provided on the heat sink adjacent to the cooling device and the optical semiconductor device, an optical system held on the frame in an optical coupling with the optical semiconductor device, and a cover member provided on the frame so as to define a hermetically sealed enclosure together with the frame and the heat sink, wherein the optical semiconductor device and the cooling device are accommodated in the hermetically sealed enclosure, and wherein at least a part of the frame carrying the optical system is formed of a material identical with a material forming the heat sink. Thereby, the part forms an integral, continuous extension of the heat sink.

7 Claims, 6 Drawing Sheets

OPTICAL MODULE HAVING AN IMPROVED HEAT DISSIPATION AND REDUCED MECHANICAL DISTORTION

BACKGROUND OF THE INVENTION

The present invention generally relates to optical devices for use in optical telecommunications and more particularly to an optical module used for transmitting and receiving optical signals in an optical fiber telecommunication system.

In an optical fiber telecommunication system in which optical signals are transmitted by way of an optical fiber, use of an optical module is indispensable. An optical module is a device in which a laser diode and a photodiode are accommodated in a common, hermetically sealed case. The laser diode in the optical module is used for transmitting optical signals along the an optical fiber, while the photodiode is used for receiving optical signals transmitted along the optical fiber.

Generally, an optical module uses a Peltier cooler for holding a laser diode and a photodiode therein at a stabilized temperature condition, such that any mechanical, and hence optical, distortions caused in the optical module as a result of temperature rise or fall inside or outside the optical module, are successfully avoided. For this purpose, the optical module includes an exposed heat sink in contact with the Peltier cooler. More specifically, the heat sink forms a part of a hermetically sealed case together with a frame member provided on the heat sink so as to surround the Peltier cooler. Thereby, the Peltier cooler is located inside the hermetically sealed case in an intimate contact with the heat sink.

The interior of the hermetically sealed case is filled with an inert gas such as a dry He gas or a $N_2$ gas, and the laser diode or photodiode inside the hermetically sealed case establishes an optical coupling with an optical fiber outside the case via an optical window provided on a part of the case. In other words, the optical window is used by the photodiode for receiving therethrough optical signals from the external optical fiber and also used by the laser diode for injecting optical signals into the optical fiber.

FIG. 1 shows the construction of a typical conventional optical module 10.

Referring to FIG. 1, the optical module 10 includes a Peltier cooler 12 provided in an intimate contact with a heat sink 11 of a thermally conductive material such as a CuW alloy or a CuMo alloy, and the Peltier cooler 12 carries thereon a mount carrier 13 in an intimate contact therewith. The mount carrier 13 carriers, in turn, a laser diode 14, a photodiode 15 and an optical system 16.

The optical system 16 includes a lens 16A in an optical alignment with the laser diode 14 and further with the photodiode 15, and the heat sink 11 carries thereon a frame 11 such that the frame 11 surrounds the Peltier cooler 12 itself as well as the laser diode 14, the photodiode 15 and the optical system 16 provided on the Peltier cooler 12.

Further, the frame 17 carries an optical window element 18 thereon, while the optical window element 18 carries an optical window 18A of a transparent material such as a sapphire, in optical alignment with the lens 16A. The optical window element 18 further includes a lens holder 19 carrying a lens 19A in optical alignment with the lens 16A via the optical window 18A, and an optical fiber 21 carrying a fiber holder 20A at an end thereof is coupled optically to the lens 19A by engaging an optical connector 20 with the lens holder 19. It should be noted that the optical connector 20 holds therein the fiber holder 20A.

As a result of the optical alignment thus achieved, the optical signals in the optical fiber 21 is fed efficiently to the photodiode 15. Further, the optical signals produced by the laser diode 14 are injected into the optical fiber 21 efficiently.

In the conventional optical module of FIG. 1, it will be noted that a cover 17A is welded on the frame 17, and thus, the cover 17A defines, together with the frame 17 and the heat sink 11, a hermetically sealed enclosure 17B. Typically, an inert gas mixture of He and $N_2$ fills the hermetically sealed enclosure 17B thus formed.

In the optical module of such a construction, the heat produced by the laser diode is transported to the heat sink 11 by the Peltier cooler 12. In order to facilitate the heat dissipation at the heat sink 11, the heat sink 11 is provided with a threaded hole 11A for mounting upon an external cooling structure.

It should be noted that the frame 17 is generally formed of a material of relatively lower thermal conductivity, such as a FeNi alloy known as Kovar or a ceramic material, a material different from the material used for the heat sink 11 so as to prevent the penetration of the heat once transported to the heat sink 11. Such a returning of the heat occurs by way of radiation from the frame 17. By forming the frame 17 by a less thermally conductive material, it is possible to retard the transportation of the heat from the heat sink 11 to the frame 17 and the problem of radiation of heat from the frame 17 into the hermetically sealed enclosure 17B is minimized.

In such a conventional optical module, therefore, the material used for the frame 17 and the material used for the heat sink 11 are different, and the frame 17 has been welded to the heat sink by using a solder or braze. However, such a welding process tends to induce a distortion in the heat sink 11 as indicated in FIG. 2A. When such a distortion occurs in the heat sink 11, the relationship between the frame 17 and the optical system 16 changes also, and the optical alignment between the optical fiber 21 and the laser diode 14 or the photodiode 15 in the optical module 10 may be lost. It should be noted that a similar distortion can occur also during a normal operation of the optical module 10 due to the difference in the thermal expansion between the heat sink 11 and the frame 17.

Further, the conventional optical module thus deformed may cause a further deformation when mounted upon an external structure as indicated in FIG. 2B. In the state of FIG. 2B, it should be noted that the heat sink 11 is now curled in an upward direction to form a slightly convex structure, and a minute space is formed between an external mounting surface and the heat sink 11. Further, the frame 17 may experience a further tensile stress and corresponding strain when the cover 17A is mounted thereon by way of a parallel seam welding process.

SUMMARY OF THE INVENTION

Accordingly, it is a general object of the present invention to provide a novel and useful optical module wherein the foregoing problems are eliminated.

Another and more specific object of the present invention is to provide an optical module having a reduced distortion and simultaneously the capability of efficient heat dissipation.

Another object of the present invention is to provide an optical module, comprising:

a heat sink;

a cooling device provided on said heat sink;

an optical semiconductor device provided on said cooling device;

a frame provided on said heat sink adjacent to said cooling device and said optical semiconductor device;

an optical system held on said frame in an optical coupling with said optical semiconductor device; and a cover member provided on said frame so as to define a hermetically sealed enclosure together with said frame and said heat sink, said optical semiconductor device and said cooling device being accommodated in said hermetically sealed enclosure;

at least a part of said frame carrying said optical system being formed of a material identical with a material forming said heat sink, said part forming an integral, continuous extension of said heat sink.

According to the present invention, it is possible to eliminate the problem of distortion of the frame with respect to the heat sink caused at the time of welding of the frame on the heat sink, for at least the part that is used for carrying the optical system. Thereby, the problem of misalignment of the optical semiconductor device with the optical system is successfully eliminated. Further, the problem of optical misalignment caused during the operation of the optical module due to the difference in the thermal expansion between the heat sink and the frame, is also eliminated successfully.

Other objects and further features of the present invention will become apparent from the following detailed description when read in conjunction with the attached drawings.

DETAILED DESCRIPTION OF THE PREFERRED EMBODIMENTS

[PRINCIPLE]

Figure 1:
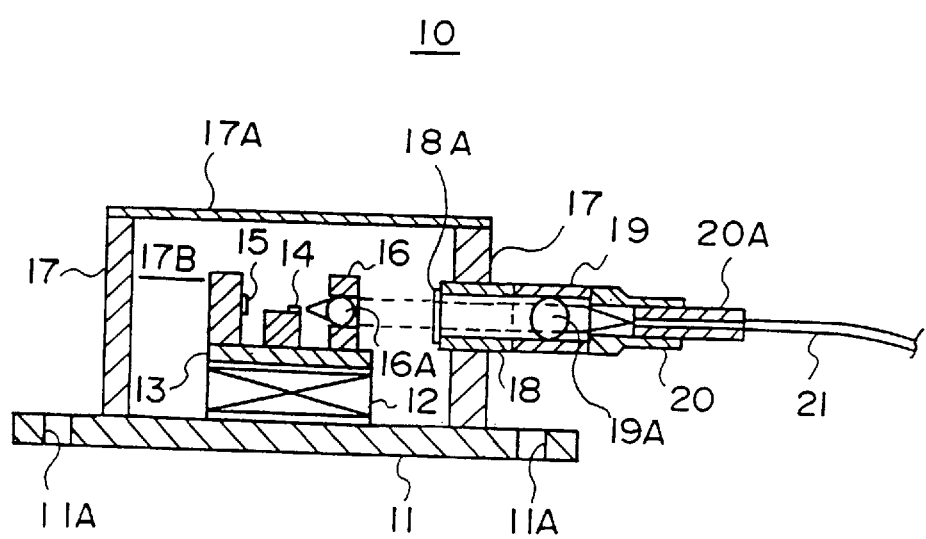
FIG. 1 is a diagram showing the construction of a conventional optical module.
Figure 2A:
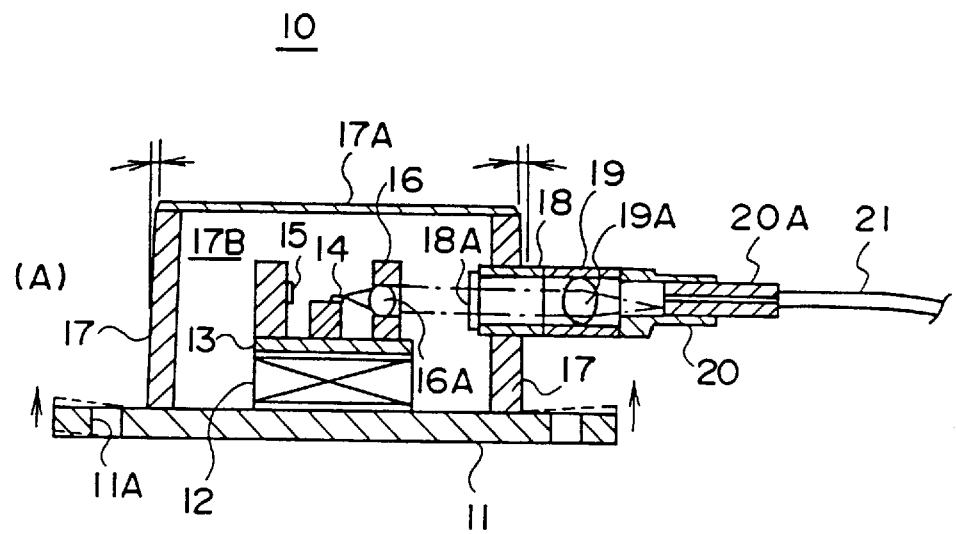
FIGS. 2A and 2B are diagrams explaining the problem encountered in the conventional optical module of FIG. 1.
Figure 2B:
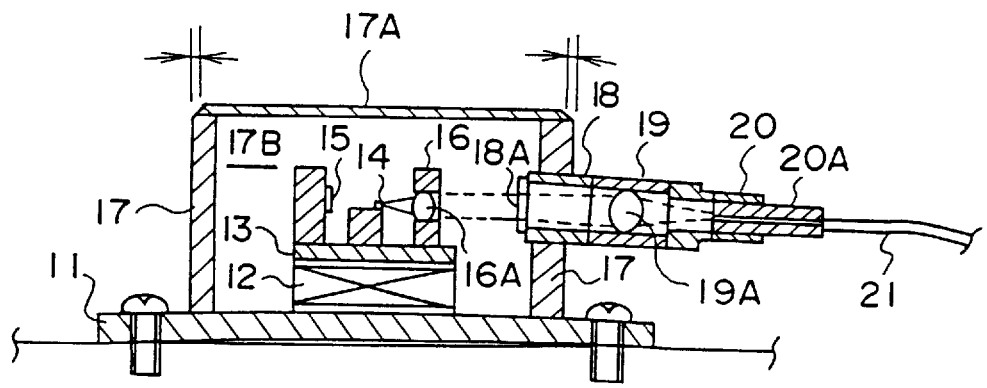

First, the principle of the present invention will be explained briefly with reference to FIG. 1.

In the present embodiment, the problem of distortion of the frame 17 at the time of welding the frame 17 on the heat sink 11 is successfully avoided by forming the frame 11, or at least a part thereof, integrally and in continuation to the heat sink 11. Thus, the frame 11 and the heat sink 11 are formed of the same material.

In using the same material for the heat sink and also for the frame as such, it is expected that the optical semiconductor device experiences various undesirable effects such as offset of laser oscillation wavelength, due to the heat radiated from the frame 17 to the hermetically sealed enclosure 17B. When such an offset of laser oscillation wavelength occurs in an optical module for use in a wavelength-multiplexed optical network, there occurs a problem of mixing up of wavelength-multiplexed optical signals. This problem of heat radiation becomes particularly acute when the frame 17, and hence the heat sink 11, is formed of a thermally conductive material used commonly for a heat sink such as CuW or CuMo.

Thus, in order to avoid the problem of conduction of the heat from the heat sink 11 to the frame 17 as well as the problem of the heat radiation from the frame 17 into the hermetically sealed enclosure 17B, the present invention uses a less conductive material for the heat sink 11 and the frame 17. For example, the heat sink 11 and the frame 17 may be formed of a FeNi alloy or a ceramic material such as $Al_2O_3$, in place of CuW or CuMo. It is also possible to use SiC. It should by noted that a FeNi alloy has a thermal conductivity of 0.04 cal/cm·sec, which is substantially smaller than the thermal conductivity of CuW, which takes a value of 0.5–0.6 cal/cm·sec depending on the composition. On the other hand, $Al_2O_3$ has a thermal conductivity of 0.04–0.06 cal/cm·sec, while SiC has a thermal conductivity of 0.15 cal/cm·sec.

When such a less conductive material is used for the heat sink 11, it is immediately expected that the efficiency of heat radiation from the heat sink 11 would become insufficient. In order to compensate for such a decrease of heat radiation at the heat sink 11, it is necessary as well as desired to increase the power of the cooling device such as the Peltier cooler 12 provided in the optical module. However, use of such a powerful Peltier cooler inevitably results in an increased distance or height of the optical axis of the optical semiconductor device as measured from the level of the heat sink 11, while such an increased height or level of the optical semiconductor device 14 or 15 leads to an increase in the overall height of the optical module body. When the overall height of the optical semiconductor device is increased as such, the optical module can no longer satisfy the specification prescribed for an optical modules for use in an existing optical telecommunication network.

Contrary to the foregoing prediction, the inventor of the present invention has discovered that, due to the increased surface area of the heat radiation structure now including not only the heat sink but also the frame, the degradation of heat dissipation, caused by the use of a less thermally conductive material for the heat sink, is effectively compensated for, without increasing the cooling power of the Peltier cooler. Further, it was discovered that such an increased radiation surface area of the optical module not only compensates for the decrease of heat dissipation but also improves the efficiency of heat dissipation as compared with the conventional construction.

Further, the optical module of the present invention is easy for fabrication due to the decreased number of welding steps as well as decreased number of components.

[FIRST EMBODIMENT]

Figure 3A:
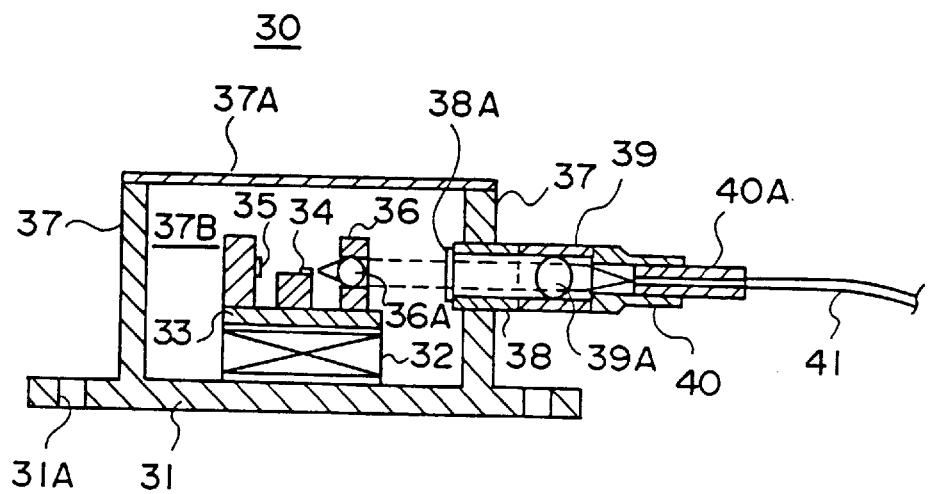
FIGS. 3A and 3B are diagrams showing the construction of an optical module according to a first embodiment of the present invention.
Figure 3B:
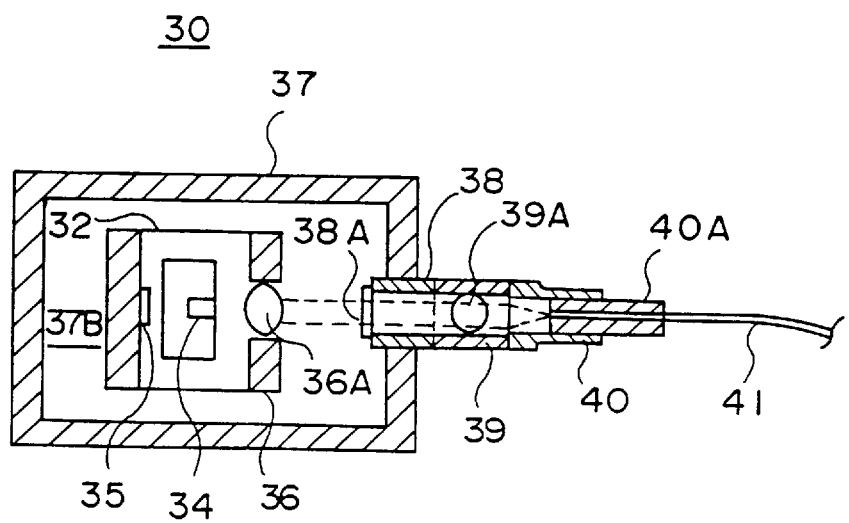

FIGS. 3A and 3B show the construction of an optical module 30 according to a first embodiment of the present invention respectively in an elevational cross sectional view and a plan view.

Referring to FIGS. 3A and 3B, the optical module 30 includes a Peltier cooler 32 provided on a heat sink 31 of a material such as a FeNi alloy, which is less thermally conductive as compared with the material such as CuW alloy or CuMo alloy used conventionally for a heat sink. Further, a mount carrier 33 corresponding to the mount carrier 13 of FIG. 1 is provided on the Peltier cooler 32, and a laser diode 34, a photodiode 35 and an optical system 36 are provided on the mount carrier 13 similarly to the optical module 10 of FIG. 1. Similarly to the optical system 16 of FIG. 1, the optical system 36 includes a lens 36A in optical alignment with the foregoing laser diode 34 and the photodiode 35.

Further, the heat sink 31 carries a frame 37B such that the frame 37B surrounds the Peltier cooler 32, on which the laser diode 34, the photodiode 35 and the optical system 36 are provided. Further, the frame 37 holds an optical window element 38 corresponding to the optical window element 18, wherein the element 18 carries thereon an optical window 38A of a transparent material such as a sapphire. On the element 38, a lens holder 39, holding thereon another lens 39A, is mounted such that the lens 39A aligns optically to the lens 36A of the optical system 36, and an optical fiber 41 carrying a fiber holder 40A on an end thereof is coupled to the lens 39A by way of an optical connector. As a result, the optical signals in the optical fiber 41 are fed to the photodiode 35 efficiently, and the optical signals produced by the laser diode 34 are injected into the optical fiber 41 also efficiently.

Further, a cover 37A is welded upon the frame 37 such that the cover 37A defines, together with the frame 37 and the heat sink 31, a hermetically sealed enclosure 37B in which the laser diode 34, the photodiode 35 and the optical system 36 are accommodated. The enclosure 37B thus formed is typically filled by an mixture of a dry He gas and a dry $N_2$ gas.

In the present embodiment, it should be noted that the frame 37 is formed integrally and continuously to the heat sink 31 by a common material. In other words, the optical module 31 of the present embodiment is formed without a welding process between the frame 37 and the heat sink 31. As the welding process is thus eliminated, the problem of optical misalignment of the optical system on the frame 37, particularly of the lens 39A and the optical fiber holder 40A, with respect to the lens 36A, is successfully eliminated.

In the optical module of such a construction, the heat produced by the laser diode 34 is transported to the heat sink 31 by the Peltier cooler 32 as usual, while the heat thus transported to the heat sink 31 may be conducted to the frame 37 from the heat sink 31 and radiated back therefrom to the hermetically sealed space 37B. When this occurs, the temperature inside the hermetically sealed space 37B increases inevitably.

On the other hand, the inventor of the present invention has discovered that such an unwanted temperature rise of the hermetically sealed space 37B in the optical module 30 can be successfully suppressed or even eliminated when a material having a low thermal conductivity, such as a FeNi alloy (known as Kovar), is used for the heat sink 31 and for the frame 37. It is believed that the construction of the present embodiment increases the overall radiation surface area and the increased radiation surface area not only compensates for the expected decrease of heat dissipation but even facilitates the heat dissipation from the optical module 30 in spite of the use of a less thermally conductive material for the heat sink 31.

Figure 4:
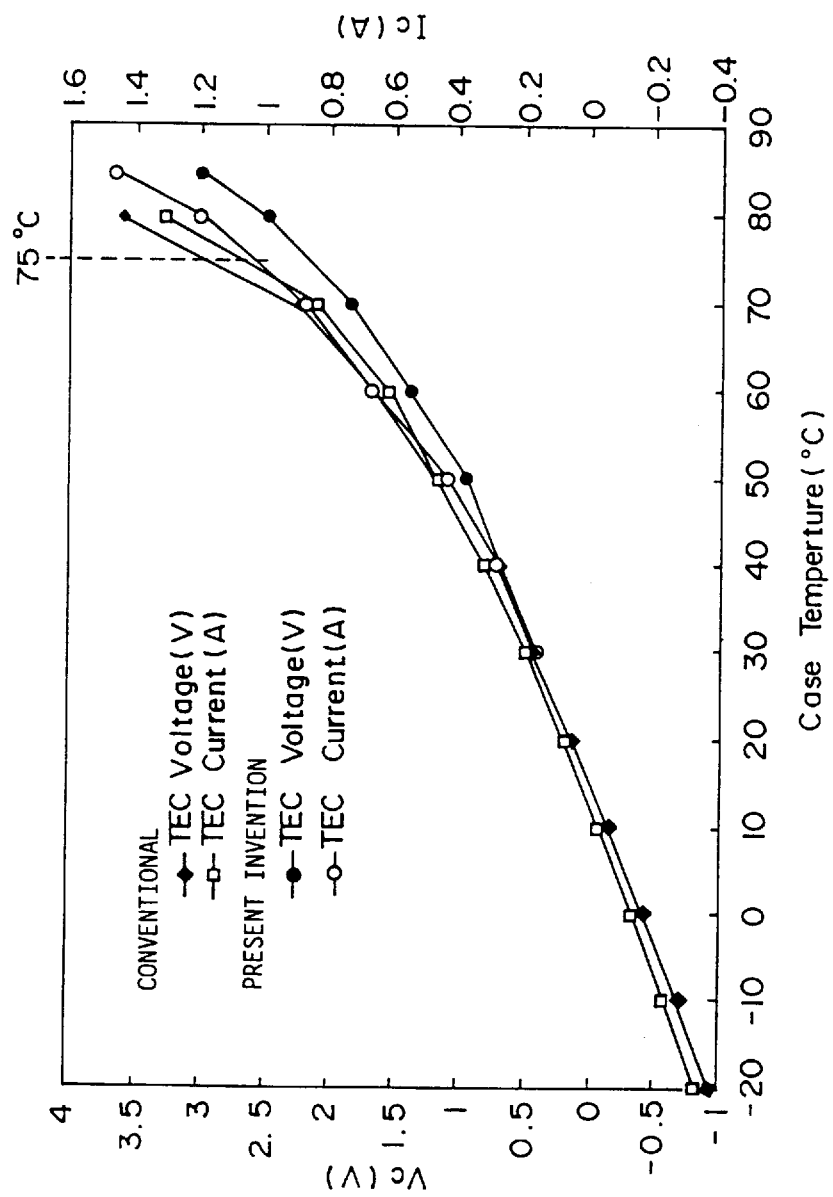
FIG. 4 is a diagram showing a cooling characteristic of the optical module of the first embodiment, in comparison with a cooling characteristic of a conventional optical module.

FIG. 4 shows the electric power needed for the Peltier cooler 32 of the optical module 30, held in a temperature environment of 30° C., for maintaining the temperature of the hermetically sealed space 37B to 25° C., wherein the solid circles and open circles represent respectively the drive voltage and the drive current of the Peltier cooler 32 of the optical module 30, while the solid diamonds and open squares represent respectively the drive voltage and the drive current of the Peltier cooler 12 of the conventional optical module 10. For the purpose of comparison, the optical module 10 and the optical module 30 are operated under the identical condition in the experiment of FIG. 4. It should be noted that the same Peltier cooler device is used for the Peltier cooler 12 and the Peltier cooler 32.

Referring to FIG. 4, it will be noted that both of the optical modules 10 and 30 show a substantially identical power consumption for the Peltier coolers as long as the environmental temperature is lower than about 30° C. When the environmental temperature exceeds 30° C., on the other hand, however, the power consumption of the Peltier cooler 32 for the optical module 30 becomes slightly smaller than the power consumption of the Peltier cooler 12 of the optical module 10. This difference of the electric power consumption between the optical module 10 and the optical module 30 increases with increasing environmental temperature up to an environmental temperature of about 75° C., beyond which the temperature regulation is no longer possible for the conventional optical module 10. On the other hand, the temperature regulation by the Peltier cooler 32 is still effective in the optical module 30 of the present embodiment, even when the environmental temperature has exceeded about 80° C.

The result of FIG. 4 clearly indicates, contrary to the prediction, that the efficiency of heat dissipation or cooling of the optical module 30 is equivalent or superior to that of the optical module 10 of FIG. 1, which has hitherto been considered optimum in terms of the efficiency of heat dissipation. As noted previously, this unexpected result is attributed to the increased radiation surface area caused by forming the frame 37 integrally to the heat sink 31.

It should be noted that the material for the frame 37 or the heat sink 31 is by no means limited to a metal, but other materials such as a ceramic material of $Al_2O_3$ or SiC may be used. The process of forming the frame 37 and the heat sink 31 in the form of an integral body is well established in the art of ceramic process technology, such as an injection molding process or a slip casting process.

[SECOND EMBODIMENT]

Figure 5A:
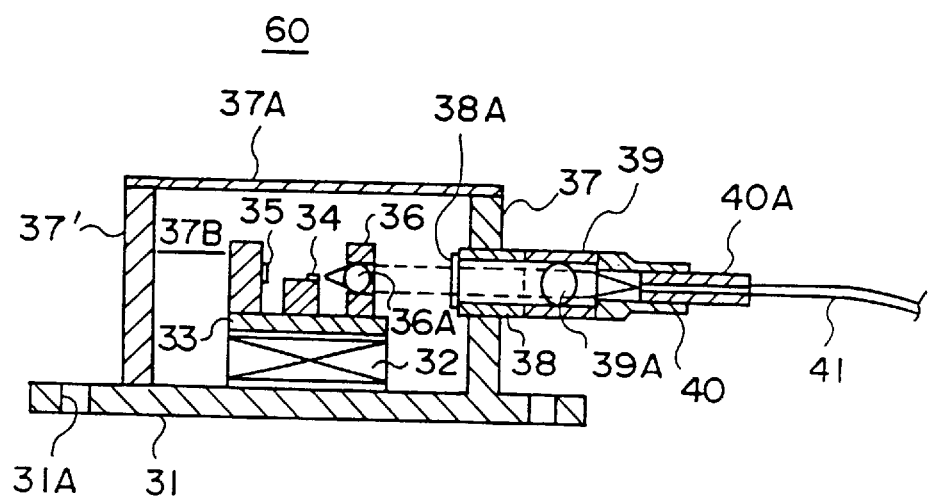
FIGS. 5A and 5B are diagrams showing the construction of an optical module according to a second embodiment of the present invention.
Figure 5B:
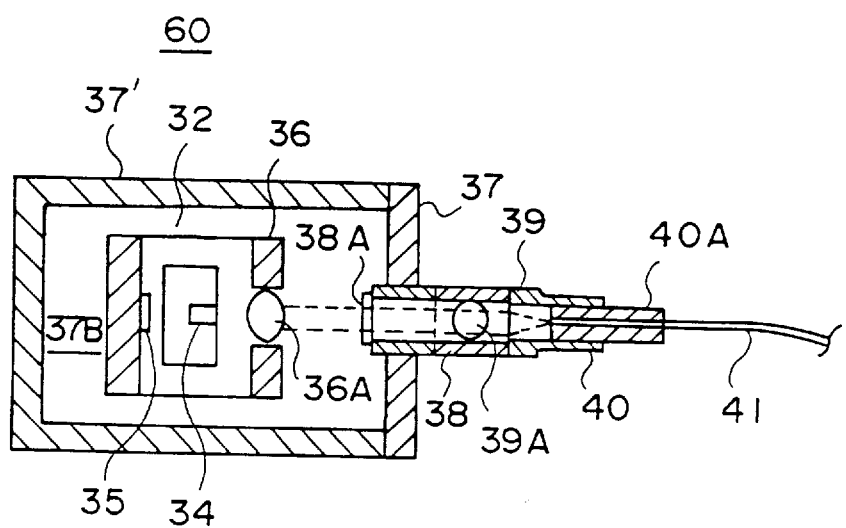

FIGS. 5A and 5B show the construction of an optical module 60 according to a second embodiment of the present invention respectively in an elevational cross sectional view and in a plan view, wherein those parts corresponding to the parts described previously are designated by the same reference numerals and the description thereof will be omitted.

Referring to FIGS. 5A and 5B, the frame 37 forms only a part of a frame structure defining the hermetically sealed enclosure 37B, wherein the frame structure now includes a frame 37' in addition to and in continuation with the frame 37. In the present embodiment, the frame 37 will be referred to as a front wall.

It should be noted that the front wall 37 is formed integrally to and in continuation with the heat sink 31. Thus, the front wall 37 is formed of a material identical to the material of the heat sink 31. On the other hand, the frame 37' may be formed of a material other than the material used for the heat sink 31. For example, the frame 37' may be formed of a ceramic material such as $Al_2O_3$ or SiC. In this case, the frame 37' is adhered to the heat sink 31 and the front wall 37 by an adhesive material.

In the construction of FIGS. 5A and 5B, it is possible to use a thermally conductive material such as CuW or CuMo, used conventionally for a heat sink, for the heat sink 31 as well as for the front wall 37, without causing the problem of the radiation of the heat from the frame 37' back into the hermetically sealed space 37B, provided that the frame 37' is formed of a less thermally conductive material such as the foregoing ceramic material or a FeNi alloy. When a FeNi alloy is used for the frame 37', it is necessary to weld the frame 37' upon the heat sink 31. Even in such a case, the problem of optical misalignment between the optical system 36 including the lens 36A and the optical fiber 41 including the lens 39A and the fiber holder 40A is minimized, contrary to the case of the conventional construction shown in FIG. 1, as the front wall 37 carrying the optical system 36 is formed integrally to the heat sink 31 without a welding process.

[THIRD EMBODIMENT]

Figure 6:
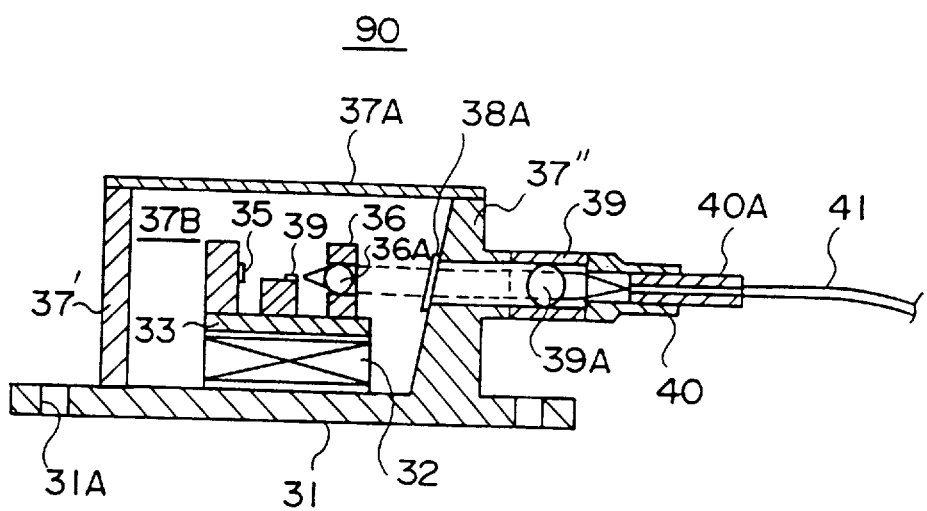
FIG. 6 is a diagram showing the construction of an optical module according to a second embodiment of the present invention.

FIG. 6 shows the construction of an optical module 90 according to a third embodiment of the present invention, wherein those parts corresponding to the parts described previously are designated by the same reference numerals and the description thereof will be omitted.

Referring to FIG. 6, the optical module 90 includes a front wall 37" in continuation with the frame 37' for defining the hermetically sealed enclosure 37B, wherein the front wall 37" has a cross-sectional shape such that the thickness of the front wall 37" decreases gradually from the base part thereof to a distal end part thereof. By forming the front wall 37" as such, the rigidity of the front wall 37" increases substantially, and the problem of distortion of the front wall 37" and hence the optical misalignment between the optical system 16 and the optical fiber 41, caused as a result of a welding of the frame 37' or the cover lid 37A upon the front wall 37", is successfully eliminated. Further, the construction of FIG. 1 in which the optical window 38A is held obliquely to the path of the optical beam therethrough is effective for avoiding the problem in which the optical beam emitted by the laser diode 39 is received by the photodiode 35 after a reflection at the surface of the optical window 38A in the case of the optical module 10 of FIG. 1.

In the present embodiment, it is also possible to form the frame 37' and the front wall 37" integrally to the heat sink 31.

Further, the present invention is not limited to the embodiments described heretofore, but various variations and modifications may be made without departing from the scope of the invention.

What is claimed is:

1. An optical module, comprising:

a heat sink;

a cooling device provided on said heat sink;

an optical semiconductor device provided on said cooling device;

a frame provided on said heat sink adjacent to said cooling device and said optical semiconductor device;

an optical system held on said frame in an optical coupling with said optical semiconductor device; and a cover member provided on said frame so as to define a hermetically sealed enclosure together with said frame and said heat sink, said optical semiconductor device and said cooling device being accommodated in said hermetically sealed enclosure;

at least a part of said frame carrying said optical system being formed of a material identical with a material forming said heat sink, said part forming an integral, continuous extension of said heat sink.

2. An optical module as claimed in claim 1, wherein an entirety of said frame is formed of said material, integrally to and in continuation with said heat sink.

3. An optical module as claimed in claim 1, wherein said material has a thermal conductivity smaller than a thermal conductivity of any of a CuW alloy and a CuMo alloy.

4. An optical module as claimed in claim 3, wherein said material includes a FeNi alloy.

5. An optical module as claimed in claim 3, wherein said material includes a ceramic material.

6. An optical module as claimed in claim 5, wherein said ceramic material is selected from a group consisting of $Al_2O_3$ and SiC.

7. An optical module as claimed in claim 1, wherein a part of said frame holding said optical system has a cross sectional shape in which a thickness of said frame decreases gradually and continuously from a base part where said frame continues to said heat sink to a distal end part thereof.

* * * * *